Patented Mar. 18, 1952

2,589,840

UNITED STATES PATENT OFFICE 2,589,840

METHOD OF PREPARING CHOLINE SALTS OF BILE ACIDS

Arthur E. Meyer, Flushing, N. Y., assignor to Fellows Medical Manufacturing Co., Inc., New York, N. Y.

No Drawing. Application August 14, 1948, Serial No. 44,393

4 Claims. (Cl. 260—397.1)

This invention relates to the process of making said choline salts by interaction of alkali salts of bile acids with salts of choline, which process is preferably carried out in an organic solvent and by precipitating the choline bile acid salts with other solvents in which they are insoluble.

Choline salts of two bile acids have been prepared before by Glücksmann. (German Patent 593,258, February 23, 1943.) According to his invention choline sulfate was mixed with a calculated quantity of barium cholate, and the barium sulfate formed was filtered off. The clear filtrate was evaporated to dryness; or choline hydroxide was mixed with an equivalent of desoxycholic acid and evaporated to dryness. It is obvious that the residues so obtained had necessarily the composition and ratio of the ingredients put into the mixture, and there is no proof that one is actually dealing with choline salts. Both methods have their industrial drawbacks because the preparation of choline base is quite cumbersome and the working with the toxic barium compound in the preparation of a pharmaceutical product presents a certain inconvenience although not an absolute objection. The present invention shows a method of preparing the choline salts of certain bile acids avoiding these difficulties and giving products of uniform composition. According to this method, the sodium salts of bile acid, especially of cholic acid, desoxycholic acid or of the natural bile acids, which are a mixture of taurocholic and glycocholic acid, are brought into contact with equivalent quantities of choline chloride. The solvent used for this purpose is preferably ethyl, methyl or any other lower alcohol, although other solvents, such as dioxane, are not excluded. The mixture thus obtained is mixed with an excess of ethyl ether, acetone, or any other ether or ester, commonly used as solvents. This causes the immediate formation of a precipitate that may be of oily consistency or of solid crystalline structure.

On standing at a temperature of about 4° for several days the choline salt in either case assumes its final form. It may be redissolved in alcohol and reprecipitated for further purification although for common use this is not necessary. The sodium chloride formed in the process is sufficiently soluble in the alcohol-ether mixture so as not to precipitate out with the choline compound. The choline salt, used in this process, does not necessarily have to be the chloride, although this salt is the most commonly available and best suited, but other choline salts such as the sulfate or the dihydrogen citrate may be used as well. The use of the sodium salt of the bile acids is also a matter of convenience; the potassium salt or the salt of any alkaline earth with bile acids may be used as well, provided the alkali salt formed as a by-product is removed in the process of precipitation of the bile-acid choline salt with ether.

A description of the procedures used is given in the following:

Example 1

8 grams of desoxycholic acid was dissolved in 100 cc. of ethyl alcohol or methyl alcohol, which required moderate heating. Disregarding whether or not the solution was complete, 0.9 gram of sodium hydroxide in 2 cc. of water was added, to form the sodium salt of desoxycholic acid. To this was added a solution of 3 grams choline chloride dissolved in 10 cc. alcohol. A complete solution was obtained which was poured into 3 volumes of ether. This caused the formation of an oily precipitate. The flask containing the mixture was stoppered and kept over night at 4–5° C. By this time the oil had been transformed into crystals which were quickly filtered off. The ethereal solution gave on addition of ½ vol. more ether after standing at 4–5° C. a white precipitate of beautiful crystals. This second yield of crystals was not considerable (about 0.8 gram). Choline determination by the method of Glick (J. Biol. Chem. 156:642 (1944)) showed in both fractions a content of 27.5–28%, calculated as choline chloride. Both fractions were combined, dissolved in a small quantity of warm ethyl alcohol, filtered and precipitated by gradual addition of 6 volumes of ethyl ether. The precipitate was white and formed large crystals in the cold. Yield 9 grams. Choline content 27.5%, as chloride, theory 28.2%. The salt is hygroscopic and dissolves easily in water. The 5% solution has a pH of about 7.6–8. When the aqueous solution is brought to a pH of 7.2 it tends to form a jelly on standing in the cold. The precipitation may also be carried out with acetone or ethyl acetate, but larger quantities of these solvents are needed.

Example 2

4 grams of desoxycholic acid were dissolved in 25 cc. of alcohol.

3 grams of choline dihydrogen citrate was suspended in 75 cc. alcohol and added to the desoxycholic acid solution. The mixture was heated until complete solution was obtained. 1.35 grams sodium hydroxide in 3 cc. water was added and the mixture was left standing. A few crystals of sodium citrate were formed, which were filtered off and the solution was precipitated with 5 volumes of ether. After standing in the cold 2 grams of crystals were obtained which were identical with those obtained in experiment 1. Owing to the larger quantities of alcohol necessary for dissolving the material, more ether was necessary for precipitation. The yield was lower than in experiment 1. Choline dihydrogen citrate is less desirable as a starting material than choline chloride.

*Example 3*

10 grams cholic acid was dissolved in 120 cc. alcohol and 1.2 grams sodium hydroxide in 2 cc. water was added, followed by 3.8 grams choline chloride in 12 cc. alcohol. Precipitation with ether as described in Example 1 gave crystals (9 grams) of choline cholate. (Choline content calculated as chloride 27%. Theory 27.3%.)

*Example 4*

10 grams cholic acid in 120 cc. alcohol was mixed with 1.2 grams sodium hydroxide in 8 cc. water and 3.8 grams choline chloride in 12 cc. alcohol. The solution had a pH 9. A few drops of acetic acid was added to adjust the reaction to 7. The crystals precipitated with ether had a choline content of 22.5. They were treated with 80 cc. of absolute alcohol, which left a part undissolved. The residue was heated with another 80 cc. of alcohol. Each solution was separately precipitated with 600 cc. of ether. Both gave crystallized precipitates. The first fraction had a choline content of 27.5% calculated as chloride. The second fraction had only 10% choline. The precipitate formed at a pH=7 contained according to this experiment some free cholic acid, which remained in the residue on first extraction with alcohol. The soluble part, however, had the theoretical choline content of choline cholate. The choline cholate does not form a jelly at any pH. The 5% solution has a pH=7.8.

*Example 5*

The mixture of the sodium salts of tourocholic and glycocholic acids, as is available commercially as "bile salts," was purified by dissolving it in a small volume of ethyl alcohol, adjusting the pH to 7.2, filtering and precipitating with an excess of acetone. The gummy precipitate was dried at 60° C.

33 grams of the purified bile salt mixture was dissolved in 100 cc. of alcohol by heating gently and 10 grams of choline chloride was added. On addition of 4 volumes of acetone a honey like precipitate was obtained. The material was separated from the supernatant fluid and heated at progressively increased temperature up to 110° in dry air. The semi-solid mass contained 22% choline calculated as chloride. The theory for choline taurocholate is 22.6%, for choline glycocholate 24.6%. The theoretical value should be between both figures, however it must be assumed that the choline-bile acid salt contained some moisture that could not be removed; hence the lower choline content. In repetition of this experiment, using ether as a precipitant a product was obtained that assayed 22.55% choline.

The choline bile salt compounds have a stimulating action on the intestine, that differs from that of the bile acids themselves.

I claim:

1. A process of preparing salts of choline with bile acids by interaction of alkali metal salts of said acids dissolved in a low chain alcohol with a soluble choline salt and separating the choline-bile-acid salt formed from the alkali metal salt by precipitating with a solvent, miscible with alcohol, in which the choline-bile-acid salt is not soluble, selected from the group consisting of ethyl ether, acetone and ethyl acetate.

2. A process of preparing choline cholate by interaction of an alkali metal salt of cholic acid with a soluble choline salt, both dissolved in a chain alcohol and separating the choline cholate by precipitating it with a solvent, miscible with the alcohol, in which the choline cholate is not soluble, selected from the group consisting of ethyl ether, acetone and ethyl acetate.

3. A process of preparing choline desoxycholate by interaction of an alkali metal salt of desoxycholic acid with a soluble choline salt, both dissolved in a low chain alcohol and separating the choline desoxycholate by precipitating it with a solvent, miscible with the alcohol, in which the choline desoxycholate is insoluble, selected from the group consisting of ethyl ether, acetone and ethyl acetate.

4. A process of preparing the choline salt of natural bile acids, comprising a mixture of taurocholic and glycocholic acid, by the interaction of an alkali metal salt of said natural bile acids with a soluble choline salt using a low chain alcohol as a solvent and effecting separation of the reaction products by precipitating the choline salt of the natural bile acids by the addition of a solvent, miscible with the alcohol, in which the choline-natural-bile-acid salt is insoluble, selected from the group consisting of ethyl ether, acetone and ethyl acetate.

ARTHUR E. MEYER.

REFERENCES CITED

The following references are of record in the file of this patent:

FOREIGN PATENTS

| Number | Country | Date |
|---|---|---|
| 593,258 | Germany | Feb. 23, 1934 |